US009513405B2

(12) United States Patent
Kaplan et al.

(10) Patent No.: US 9,513,405 B2
(45) Date of Patent: Dec. 6, 2016

(54) BIOPOLYMER PHOTONIC CRYSTALS AND METHOD OF MANUFACTURING THE SAME

(71) Applicant: Tufts University, Medford, MA (US)

(72) Inventors: David L. Kaplan, Concord, MA (US); Fiorenzo Omenetto, Lexington, MA (US); Brian Lawrence, New York, NY (US); Mark Cronin-Golomb, Reading, MA (US)

(73) Assignee: TUFTS UNIVERSITY, Medford, MA (US)

( * ) Notice: Subject to any disclaimer, the term of this patent is extended or adjusted under 35 U.S.C. 154(b) by 311 days.

(21) Appl. No.: 14/065,369

(22) Filed: Oct. 28, 2013

(65) Prior Publication Data
US 2014/0205797 A1    Jul. 24, 2014

Related U.S. Application Data

(63) Continuation of application No. 12/513,384, filed as application No. PCT/US2007/083600 on Nov. 5, 2007, now abandoned.

(60) Provisional application No. 60/935,459, filed on Aug. 14, 2007, provisional application No. 60/856,297, filed on Nov. 3, 2006.

(51) Int. Cl.
G02B 1/00        (2006.01)
B29D 11/00       (2006.01)
B82Y 20/00       (2011.01)
G02B 6/122       (2006.01)

(52) U.S. Cl.
CPC .............. G02B 1/005 (2013.01); B29D 11/00 (2013.01); B82Y 20/00 (2013.01); G02B 6/1225 (2013.01); Y10T 428/24273 (2015.01); Y10T 428/24355 (2015.01); Y10T 428/31678 (2015.04)

(58) Field of Classification Search
CPC ..................................................... G02B 1/005
See application file for complete search history.

(56) References Cited

U.S. PATENT DOCUMENTS

| | | |
|---|---|---|
| 4,676,640 A | 6/1987 | Briggs |
| 4,977,902 A | 12/1990 | Sekino et al. |
| 4,999,295 A | 3/1991 | Asakura et al. |
| 5,244,799 A | 9/1993 | Anderson |
| 5,252,285 A | 10/1993 | Lock |
| 5,427,096 A | 6/1995 | Bogusiewicz et al. |
| 5,474,915 A | 12/1995 | Dordick et al. |
| 5,512,218 A | 4/1996 | Gresser et al. |
| 5,552,270 A | 9/1996 | Khrapko et al. |
| 6,134,045 A | 10/2000 | Jiang et al. |
| 6,150,491 A | 11/2000 | Akkara |
| 6,284,418 B1 | 9/2001 | Trantolo |
| 6,753,064 B1 | 6/2004 | Nakama et al. |
| 6,924,503 B2 | 8/2005 | Cheng et al. |
| 6,989,897 B2 | 1/2006 | Chan et al. |
| 6,992,325 B2 | 1/2006 | Huang |
| 7,223,609 B2 | 5/2007 | Anvar et al. |
| 7,267,958 B2 | 9/2007 | Dordick et al. |
| 7,476,398 B1 | 1/2009 | Doillon et al. |
| 7,498,802 B2 | 3/2009 | Takahata |
| 7,713,778 B2 | 5/2010 | Li et al. |
| 8,005,526 B2 | 8/2011 | Martin et al. |
| 8,348,974 B2 | 1/2013 | Asakura |
| 8,529,835 B2 | 9/2013 | Kaplan et al. |
| 2001/0002417 A1 | 5/2001 | Akkara et al. |
| 2001/0003043 A1 | 6/2001 | Metspalu et al. |
| 2003/0020915 A1 | 1/2003 | Schueller et al. |
| 2003/0203366 A1 | 10/2003 | Lim et al. |
| 2003/0214057 A1 | 11/2003 | Huang |
| 2004/0001299 A1 | 1/2004 | van Haaster et al. |
| 2004/0029241 A1 | 2/2004 | Hahn et al. |
| 2004/0081384 A1 | 4/2004 | Datesman et al. |
| 2004/0229349 A1 | 11/2004 | Daridon |
| 2005/0008675 A1 | 1/2005 | Bhatia et al. |
| 2005/0151966 A1 | 7/2005 | Packirisamy et al. |
| 2005/0169962 A1 | 8/2005 | Bhatia et al. |
| 2005/0194365 A1 | 9/2005 | Li |

(Continued)

FOREIGN PATENT DOCUMENTS

EP    0245509 A1    11/1987
EP    1025988 A1    8/2000
(Continued)

OTHER PUBLICATIONS

A. P. Joglekar et al., A Study of the Deterministic Character of Optical Damage by Femtosecond Laser Pulses and Applications to Nanomachining, 77 APPL. PHYS. B 25-30 (2003).*
Y. Liu et al., 3D Femtosecond Laser Patterning of Collagen for Directed Cell Attachment, 26 Biomaterials 4597-4605 (2005).*
Anderson, J. et al., Bioactive Silk-Like Protein Polymer Films on Silicon Devices, Materials Research Society Synthesis and Thermoelectric Properties, 330:171-177 (1994).
Bai, J. et al., Regenerated spider silk as a new biomaterial for MEMS, Biomed Microdevices, 8:317-323 (2006).
Chrisey, D.B. et al., Laser Deposition of Polymer and Biomaterial Films, Chem. Rev 103(2):553-576 (2003).
Extended European Search Report for EP 09767706.6, 6 pages (Jan. 8, 2013).
Extended European Search Report for EP 13156510.3, 7 pages (Oct. 11, 2013).

(Continued)

Primary Examiner — Randy Boyer
(74) Attorney, Agent, or Firm — Choate Hall & Stewart, LLP

(57) ABSTRACT

A method of manufacturing a biopolymer photonic crystal includes providing a biopolymer, processing the biopolymer to yield a biopolymer matrix solution, providing a substrate, casting the matrix solution on the substrate, and drying the biopolymer matrix solution to form a solidified biopolymer film. A surface of the film is formed with a nanopattern, or a nanopattern is machined on a surface of the film. In another embodiment, a plurality of biopolymer films is stacked together. A photonic crystal is also provided that is made of a biopolymer and has a nanopatterned surface. In another embodiment, the photonic crystal includes a plurality of nanopatterned films that are stacked together.

24 Claims, 10 Drawing Sheets

(56) References Cited

U.S. PATENT DOCUMENTS

| | | |
|---|---|---|
| 2005/0208469 A1 | 9/2005 | Daunert et al. |
| 2005/0213868 A1 | 9/2005 | Cunningham |
| 2005/0217990 A1 | 10/2005 | Sibbett et al. |
| 2005/0276791 A1 | 12/2005 | Hansford et al. |
| 2006/0024813 A1 | 2/2006 | Warthoe |
| 2006/0042822 A1 | 3/2006 | Azeyanagi et al. |
| 2006/0091571 A1 | 5/2006 | Akutsu et al. |
| 2006/0111517 A1 | 5/2006 | Feucht et al. |
| 2006/0134606 A1 | 6/2006 | Montagu |
| 2006/0141617 A1 | 6/2006 | Desai et al. |
| 2006/0177479 A1 | 8/2006 | Giachelli et al. |
| 2006/0178655 A1 | 8/2006 | Santini et al. |
| 2006/0226575 A1 | 10/2006 | Maghribi et al. |
| 2006/0236436 A1 | 10/2006 | Li et al. |
| 2007/0007661 A1 | 1/2007 | Burgess et al. |
| 2007/0009968 A1 | 1/2007 | Cunningham et al. |
| 2007/0026064 A1 | 2/2007 | Yoder et al. |
| 2007/0031607 A1 | 2/2007 | Dubson et al. |
| 2007/0042505 A1 | 2/2007 | Israel et al. |
| 2007/0058254 A1 | 3/2007 | Kim |
| 2007/0073130 A1 | 3/2007 | Finch et al. |
| 2007/0178240 A1 | 8/2007 | Yamazaki et al. |
| 2007/0224677 A1 | 9/2007 | Neumann |
| 2007/0233208 A1 | 10/2007 | Kurtz et al. |
| 2007/0275030 A1 | 11/2007 | Muratoglu et al. |
| 2008/0019925 A1 | 1/2008 | Begleiter |
| 2008/0038236 A1 | 2/2008 | Gimble et al. |
| 2008/0152281 A1 | 6/2008 | Lundquist et al. |
| 2008/0203431 A1 | 8/2008 | Garcia et al. |
| 2008/0239755 A1 | 10/2008 | Parker et al. |
| 2008/0288037 A1 | 11/2008 | Neysmith et al. |
| 2009/0028910 A1 | 1/2009 | DeSimone et al. |
| 2009/0208555 A1 | 8/2009 | Kuttler et al. |
| 2010/0028451 A1 | 2/2010 | Kaplan et al. |
| 2010/0046902 A1 | 2/2010 | Kaplan et al. |
| 2010/0063404 A1 | 3/2010 | Kaplan et al. |
| 2010/0068740 A1 | 3/2010 | Kaplan et al. |
| 2010/0070068 A1 | 3/2010 | Kaplan et al. |
| 2010/0120116 A1 | 5/2010 | Kaplan et al. |
| 2011/0135697 A1 | 6/2011 | Omenetto et al. |
| 2012/0034291 A1 | 2/2012 | Amsden et al. |
| 2013/0323811 A1 | 12/2013 | Kaplan et al. |
| 2014/0205797 A1 | 7/2014 | Kaplan et al. |
| 2014/0349380 A1 | 11/2014 | Omenetto et al. |

FOREIGN PATENT DOCUMENTS

| | | |
|---|---|---|
| EP | 1116987 A2 | 7/2001 |
| EP | 1166987 A2 | 1/2002 |
| EP | 1209280 A2 | 5/2002 |
| EP | 1467224 A1 | 10/2004 |
| JP | 60-142259 A | 7/1985 |
| JP | 60-155129 A | 8/1985 |
| JP | H01-135853 A | 5/1989 |
| JP | 01280242 A | 11/1989 |
| JP | 02-086799 A | 3/1990 |
| JP | 11-042106 A | 2/1999 |
| JP | H11-123791 A | 5/1999 |
| JP | H11-183854 A | 7/1999 |
| JP | 2000-019119 A | 1/2000 |
| JP | 2000-096490 A | 4/2000 |
| JP | 2000-143472 A | 5/2000 |
| JP | 2000-180969 A | 6/2000 |
| JP | 2001-147301 A | 5/2001 |
| JP | 2001-280242 A | 10/2001 |
| JP | 2002-287377 A | 10/2002 |
| JP | 2003-195001 A | 7/2003 |
| JP | 2003-322729 A | 11/2003 |
| JP | 2004-162209 A | 6/2004 |
| JP | 2004-307661 A | 11/2004 |
| JP | 2005-031724 A | 2/2005 |
| JP | 2005-530983 A | 10/2005 |
| JP | 2006-119424 A | 5/2006 |
| JP | 2006-241450 A | 9/2006 |
| JP | 2011-123791 A | 6/2011 |
| JP | 05-039368 B2 | 10/2012 |
| KR | 20060027113 A | 3/2006 |
| KR | 20070060822 A | 6/2007 |
| KR | 20080069553 A | 7/2008 |
| WO | WO-93/15244 A1 | 8/1993 |
| WO | WO-96/05510 A2 | 2/1996 |
| WO | WO-00/31752 A2 | 6/2000 |
| WO | WO-01/10464 A1 | 2/2001 |
| WO | WO-01/85637 A2 | 11/2001 |
| WO | WO-03/038033 A2 | 5/2003 |
| WO | WO-2004/000915 A2 | 12/2003 |
| WO | WO-2004/071949 A2 | 8/2004 |
| WO | WO-2004/092250 A1 | 10/2004 |
| WO | WO-2005/012606 A2 | 2/2005 |
| WO | WO-2005/019503 A2 | 3/2005 |
| WO | WO-2005/031724 A1 | 4/2005 |
| WO | WO-2005/103670 A1 | 11/2005 |
| WO | WO-2005/123114 A2 | 12/2005 |
| WO | WO-2006/020507 A1 | 2/2006 |
| WO | WO-2008/004356 A1 | 1/2008 |
| WO | WO-2008/118211 A2 | 10/2008 |
| WO | WO-2008/127402 A2 | 10/2008 |
| WO | WO-2008/127403 A2 | 10/2008 |
| WO | WO-2008/127404 A2 | 10/2008 |
| WO | WO-2008/127405 A2 | 10/2008 |
| WO | WO-2008/140562 A2 | 11/2008 |
| WO | WO-2009/061823 A1 | 5/2009 |
| WO | WO-2010/042798 A2 | 4/2010 |
| WO | WO-2010/059963 A2 | 5/2010 |
| WO | WO-2010/126640 A2 | 11/2010 |

OTHER PUBLICATIONS

Extended European Search Report for EP 13156523.6, 9 pages (Dec. 18, 2013).
Fukuoka T. et al., Enzymatic Polymerization of Tyrosine Derivatives. Peroxidase—and Protease-Catalyzed Synthesis of Poly(tyrosine)s with Different Structures, Biomacromolecules 3(4):768-774 (2002).
International Search Report for PCT/US2007/083600, 3 pages (Nov. 5, 2008).
International Search Report for PCT/US2007/083620, 3 pages (Dec. 5, 2008).
International Search Report for PCT/US2007/083642, 3 pages (Nov. 5, 2008).
International Search Report for PCT/US2007/083646, 4 pages (Dec. 15, 2008).
International Search Report for PCT/US2011/032195, 3 pages (Oct. 27, 2011).
International Search Report for PCT/US2007/083605, mailed Dec. 15, 2008, 6 pages.
International Search Report for PCT/US2007/083634, mailed Nov. 5, 2008, 5 pages.
International Search Report for PCT/US/2007/083639, mailed Dec. 12, 2008, 5 pages.
International Search Report of PCT/US2008/082487, mailed Feb. 27, 2009, 3 pages.
International Search Report of PCT/US2009/047751, mailed Feb. 2, 2010, 3 pages.
International Search Report of PCT/US2010/022701, mailed Mar. 31, 2010, 2 pages.
International Search Report of PCT/US2010/024004, mailed Nov. 26, 2010, 5 pages.
International Search Report of PCT/US2010/042585, mailed May 25, 2011, 8 pages.
International Search Report of PCT/US2010/047307, mailed Apr. 28, 2011, 3 pages.
International Search Report of PCT/US2010/050468, mailed Jan. 6, 2011, 3 pages.
International Search Report of PCT/US2011/028094, mailed Jul. 14, 2011, 4 pages.
International Search Report of PCT/US2011/041002, 4 pages (Feb. 29, 2012).
IPRP for PCT/US2007/083642, 6 pages (May 5, 2009).
IPRP of PCT/US2007/083600, mailed May 5, 2009, 6 pages.
IPRP of PCT/US2007/083605, mailed May 5, 2009, 10 pages.

(56) References Cited

OTHER PUBLICATIONS

IPRP of PCT/US2007/083620, mailed May 5, 2009, 6 pages.
IPRP of PCT/US2007/083634, mailed May 5, 2009, 6 pages.
IPRP of PCT/US2007/083639, mailed May 5, 2009, 6 pages.
IPRP of PCT/US2007/083646, mailed May 5, 2009, 10 pages.
IPRP of PCT/US2008/082487, mailed May 11, 2010, 10 pages.
IPRP of PCT/US2009/047751, mailed Dec. 18, 2010, 5 pages.
IPRP of PCT/US2010/022701, mailed Aug. 2, 2011, 5 pages.
IPRP of PCT/US2010/024004, mailed Aug. 16, 2011, 6 pages.
IPRP of PCT/US2010/042585, mailed Jan. 24, 2012, 6 pages.
IPRP of PCT/US2010/047307, mailed Mar. 6, 2012, 5 pages.
Jiang, W. et al, Silicon and Polymer Nanophotonic Devices Based on Photonic Crystals, Proceedings of the International Society of Optical Engineering, 6124(1):612410-1(2006).
Jin, H.J. et al., Water-Stable Silk Films with Reduced βSheet Content, Advanced Functional Materials, 15:1241-1247 (2005).
Kouba et al., Fabrication of Nanoimprint Stamps for Photonic Crystals, Journal of Physics: Conference Series, 34(1):897-903 (2006).
Lawrence, B.D. et al., Bioactive silk protein biomaterial systems for optical devices, Biomacromolecules, 9:1214-1220 (2008).
Min, B.M. et al., Regenerated Silk Fibroin Nanofibers: Water Vapor-Induced Structural Changes and Their Effects on the Behavior of Normal Human Cells, Macromol. Biosci., 6(4):285-292 (2006).
Minoura, N. et al., Attachment and Growth of Cultured Fibroblast Cells on Silk Protein Matrices, J. Biomed. Mater. Res. 29(10):1215-1221 (1995).
Notification of Transmittal of International Search Report and the Written Opinion of PCT/US2011/032195, mailed Oct. 27, 2011, 2 pages.
Partial European Search Report for EP 13156523.6, 6 pages (Aug. 28, 2013).
Ramanujam, P.S., Optical Fabrication of Nano-Structured Biopolymer Surfaces, Opt. Mater. 27:1175-1177 (2005).
Tamada, Y., New Process to Form a Silk Fibroin Porous 3-D Structure, Biomacrocolecules, 6:3100-3106 (2005).
Tu, D. et al., A ZEP520-LOR Bilayer Resist Lift-Off Process By E-Beam Lithography For Nanometer Pattern Transfer, Proceedings of the 7th IEEE Conference on Nanotechnology, 624-627 (2007).
Verma, M.K. et al., Embedded Template-Assisted Fabrication of Complex Microchannels in PDMS and Design of a Microfluidic Adhesive, Langmuir, 22(24) 10291-10295 (2006).
Wang, L. et al., Fabrication Of Polymer Photonic Crystal Superprism Structures Using Polydimethylsiloxane Soft Molds Journal of Applied Physics, 101(11):114316/1-6 (2007).
Wang, X. et al., Biomaterial coatings by stepwise deposition of silk fibroin, Langmuir, 21(24):11335-41 (2005).
Written Opinion for PCT/US2011/032195, 5 pages (Oct 27, 2011).
Written Opinion for PCT/US2007/083600, 5 pages (Nov. 5, 2008).
Written Opinion for PCT/US2007/083620, 5 pages (Dec. 5, 2008).
Written Opinion for PCT/US2007/083642, 5 pages (Nov. 5, 2008).
Written Opinion for PCT/US2007/083646, 9 pages (Dec. 15, 2008).
Written Opinion of PCT/US2007/083605, mailed Dec. 15, 2008, 9 pages.
Written Opinion of PCT/US2007/083634, mailed Nov. 5, 2008, 5 pages.
Written Opinion of PCT/US2007/083639, mailed Dec. 12, 2008, 5 pages.
Written Opinion of PCT/US2008/082487, mailed Feb. 27, 2009, 9 pages.
Written Opinion of PCT/US2009/047751, mailed Feb. 2, 2010, 4 pages.
Written Opinion of PCT/US2010/022701, mailed Mar. 31, 2010, 4 pages.
Written Opinion of PCT/US2010/024004, mailed Nov. 26, 1010, 5 pages.
Written Opinion of PCT/US2010/042585, mailed May 25, 2011, 5 pages.
Written Opinion of PCT/US2010/047307, mailed on Apr. 28, 2011, 4 pages.
Xu, P. and Kaplan, D.L., Horseradish peroxidase catalyzed polymerization of tyrosine derivatives for nanoscale surface patterning, Journal of Macromolecular Science, Part A: Pure and Applied Chemistry, 41(12):1437-1445 (2004).
Yang, L.J. et al., Fabrication of SU-8 embedded microchannels with circular cross-section. International Journal of Machine Tools & Manufacturing, 44:1109-1114 (2004).

* cited by examiner

BIOPOLYMER PHOTONIC CRYSTALS AND METHOD OF MANUFACTURING THE SAME

CROSS-REFERENCE TO RELATED APPLICATIONS

This application claims the benefit of priority of U.S. Provisional Application Ser. No. 60/856,297 filed on Nov. 3, 2006, entitled "Biopolymer Devices and Methods for Manufacturing the Same." This application also claims the benefit of priority of U.S. Provisional Application Ser. No. 60/935,459, filed on Aug. 14, 2007, entitled "Biopolymer Photonic Crystal and Method of Manufacturing the Same." This application claims the benefit of priority of U.S. patent application Ser. No. 12/513,384, filed May 4, 2009, which is a 35 U.S.C. 371 National Stage of International Application No. PCT/US2007/083600, filed Nov. 5, 2007, entitled "Biopolymer Photonic Crystal and Method of Manufacturing the Same." The contents of each of which are hereby incorporated by reference in their entirety.

GOVERNMENT SUPPORT

The invention was made with government support under grant number FA95500410363 awarded by the Air Force Office of Scientific Research. The government has certain rights in this invention.

BACKGROUND OF THE INVENTION

1. Field of the Invention

The present invention is directed to biopolymer photonic crystals and methods for manufacturing such photonic crystals.

2. Description of Related Art

The field of optics is well established. Some subfields of optics include diffractive optics, micro-optics, photonics, and guided wave optics. Various optical devices have been fabricated in these and other subfields of optics for research and commercial application. For example, common optical devices include diffraction gratings, photonic crystals, optofluidic devices, waveguides, and the like.

Photonic crystals are periodic dielectric or metallo-dielectric structures that define allowed and forbidden electronic energy bands. In this fashion, photonic crystals are designed to affect the propagation of electromagnetic (EM) waves in the same manner in which the periodic potential in a semiconductor crystal affects electron motion.

Photonic crystals include periodically repeating internal regions of high and low dielectric constants. Photons propagate through the structure based upon the wavelength of the photons. Photons with wavelengths of light that are allowed to propagate through the structure are called "modes". Photons with wavelengths of light that are not allowed to propagate are called "photonic band gaps". The structure of the photonic crystals define allowed and forbidden electronic energy bands. The photonic band gap is characterized by the absence of propagating EM modes inside the structures in a range of wavelengths and may be either a full photonic band gap or a partial photonic band gap, and gives rise to distinct optical phenomena such as inhibition or enhancement of spontaneous emission, spectral selectivity of light, or spatial selectivity of light. Such structures can be used for high-reflecting omni-directional mirrors and low-loss waveguides. Photonic crystals are attractive optical devices for controlling and manipulating the flow of light. Photonic crystals are also of interest for fundamental and applied research and are being developed for commercial applications. Two-dimensional periodic photonic crystals are being used to develop integrated-device applications.

Advances in micro-technology and nanotechnology have led to the miniaturization of a number of devices. Applied scientists and researchers continue to attempt to engineer control matter on the atomic and molecular scale and to build devices in that size range. These scientists drawing from applied physics, materials science, interface and colloid science, device physics, chemistry, and engineering disciplines to bring existing technology to the nanoscale.

Lithographic techniques serve to facilitate development of nanoscale devices by selectively removing portions of thin films or substrates. Scanning probe lithography incorporates a microscopic stylus that is mechanically moved across a surface to form new patterns on the film. The new patterns are formed by mechanically deforming the surface of the film using nanoimprint lithography or by transferring a chemical to the surface of the film.

Dip Pen Nanolithography® (DPN) is a scanning probe lithography technique that may use an atomic force microscope tip to transfer molecules to the film surface using a solvent meniscus. This technique allows surface patterning on scales of under 100 nanometers. DPN is the nanotechnology analog of a quill pen, where the tip of an atomic force microscope cantilever acts as a "pen," which is coated with a chemical compound or a mixture acting as an "ink," and put in contact with a substrate, the "paper."

DPN enables direct deposition of nanoscale materials onto a substrate in a flexible manner. The vehicle for deposition can include pyramidal scanning probe microscope tips, hollow tips, and even tips on thermally actuated cantilevers.

Photonic crystals and other optical devices are fabricated using various methods, depending on the application and optical characteristics desired. However, these optical devices, and the fabrication methods employed in their manufacture, generally involve significant use of non-biodegradable materials. For example, glass, fused silica, or plastic are commonly used in optical devices. Such materials are not biodegradable, and remain in the environment for extended period of time after the optical devices are removed from service and discarded. Of course, some of the materials can be recycled and reused. However, recycling also requires expenditure of natural resources, and adds to the environmental costs associated with such materials.

Therefore, there exists an unfulfilled need for optical devices such as photonic crystals that minimize the negative impact to the environment. In addition, there exists an unfulfilled need for photonic crystals that provide additional functional features that are not provided by conventional photonic crystals.

SUMMARY OF THE INVENTION

In view of the foregoing, objects of the present invention are to provide novel photonic crystals and methods for manufacturing such photonic crystals.

One aspect of the present invention is to provide photonic crystals made from a biopolymer.

Another aspect of the present invention is to provide a method for manufacturing such biopolymer photonic crystals.

One advantage of the present invention is in providing photonic crystals that minimize the negative impact to the environment.

Another advantage of the present invention is in providing photonic crystals that are biocompatible.

Yet another advantage of the present invention is in providing photonic crystals that have additional functional features that are not provided by conventional photonic crystals.

In the above regard, inventors of the present invention recognized that biopolymers, and especially silk proteins, present novel structure and resulting functions. For example, from a materials science perspective, silks spun by spiders and silkworms represent the strongest and toughest natural fibers known and present various opportunities for functionalization, processing, and biocompatibility. Over five millennia of history accompany the journey of silk from a sought-after textile to a scientifically attractive fiber. As much as its features had captivated people in the past, silk commands considerable attention in this day and age because of its strength, elasticity, and biochemical properties. The novel material features of silks have recently been extended due to insights into self-assembly and the role of water in assembly. These insights, in turn, have led to new processing methods to generate hydrogels, ultrathin films, thick films, conformal coatings, three dimensional porous matrices, solid blocks, nanoscale diameter fibers, and large diameter fibers.

Silk-based materials achieve their impressive mechanical properties with natural physical crosslinks of thermodynamically stable protein secondary structures also known as beta sheets (β-sheets). Thus, no exogenous crosslinking reactions or post process crosslinking is required to stabilize the materials. The presence of diverse amino acid side chain chemistries on silk protein chains facilitates coupling chemistry for functionalizing silks, such as with cytokines, morphogens, and cell binding domains. There are no known synthetic or biologically-derived polymer systems that offer this range of material properties or biological interfaces, when considering mechanical profiles, aqueous processing, room-temperature processing, ease of functionalization, diverse modes of processing, self-forming crosslinks, biocompatibility, and biodegradability.

While no other biopolymer or synthetic polymer can match the range of features outlined above for silk, some other polymers that exhibit various properties similar or analogous to silk have been identified by the inventors of the present invention. In particular, other natural biopolymers including chitosan, collagen, gelatin, agarose, chitin, polyhydroxyalkanoates, pullan, starch (amylose amylopectin), cellulose, hyaluronic acid, and related biopolymers have been identified. In view of the above noted features of biopolymers and of silk in particular, the present invention provides novel photonic crystals, and methods for manufacturing such photonic crystals made from a biopolymer.

In one embodiment of the present invention, silk is substituted for dielectrics or metallo-dielectrices to afford fabrication of biophotonic crystals (BPCs). In accordance with one aspect of the present invention, a method of manufacturing a biopolymer photonic crystal is provided. In one embodiment, the method includes providing at least one biopolymer film with nanopatterned features on a surface thereof, which can be utilized as a photonic crystal. In a preferred embodiment, the method includes providing a plurality of nanopatterned biopolymer films, and stacking the plurality of nanopatterned biopolymer films together. In this regard, the plurality of nanopatterned biopolymer films may be oriented so that adjacent biopolymer films have differing orientations. The method may further include binding the stacked plurality of nanopatterned biopolymer films to each other.

In accordance with one embodiment, the nanopatterned biopolymer films comprise silk, chitosan, collagen, gelatin, agarose, chitin, polyhydroxyalkanoates, pullan, starch (amylose amylopectin), cellulose, hyaluronic acid, and related biopolymers. In another embodiment, the method also includes embedding an organic material in the nanopatterned biopolymer film. For example, the organic material may be embedded in the nanopatterned biopolymer films and/or may be coated on a surface of the nanopatterned biopolymer films. Other materials may be embedded in the biopolymer or used in the coating, including biological materials or other materials depending upon the type of biopolymer photonic crystal desired. The devices may be processed within the biopolymer film, coupled to the surface of the device, or sandwiched within layers to further provide recognition and response functions. The organic material may be red blood cells, horseradish peroxidase, phenolsulfonphthalein, nucleic acid, a dye, a cell, an antibody, enzymes, for example, peroxidase, lipase, amylose, organophosphate dehydrogenase, ligases, restriction endonucleases, ribonucleases, DNA polymerases, glucose oxidase, laccase, cells, viruses, proteins, peptides, small molecules (e.g., drugs, dyes, amino acids, vitamins, antioxidants), DNA, RNA, RNAi, lipids, nucleotides, aptamers, carbohydrates, chromophores, light emitting organic compounds such as luciferin, carotenes and light emitting inorganic compounds (such as chemical dyes), antibiotics, antifungals, antivirals, light harvesting compounds such as chlorophyll, bacteriorhodopsin, protorhodopsin, and porphyrins and related electronically active compounds, or a combination thereof can be added.

In accordance with one preferred embodiment, the step of providing a biopolymer film or a nanopatterned biopolymer film includes providing a biopolymer, processing the biopolymer to yield a biopolymer matrix solution, providing a substrate, casting the matrix solution on the substrate, and drying the biopolymer matrix solution to form a solidified biopolymer film. In such an embodiment, the solidified biopolymer film may be annealed and additionally dried. In addition, the annealing of the solidified biopolymer film may be performed in a vacuum environment, and/or a water vapor environment.

Moreover, the substrate may include a nanopatterned surface so that when the biopolymer matrix solution is cast on the nanopatterned surface of the substrate, the solidified biopolymer film is formed with a surface having a nanopattern thereon. In this regard, the substrate may be an optical device such as a lens, a microlens array, an optical grating, a pattern generator, a beam reshaper, or other suitable arrangement of geometrical features such as holes, pits, and the like. In one preferred method, the biopolymer matrix solution is an aqueous silk fibroin solution having approximately 1.0 wt % to 30 wt % silk, inclusive.

In accordance with another embodiment of the method of the present invention, the at least one nanopatterned biopolymer film is provided by machining a nanopattern on the solidified biopolymer film, for example, machining an array of holes and/or pits. This machining of the nanopattern on the solidified biopolymer film may be performed using an appropriate fabrication method. For example, such machining may be performed using soft lithography techniques and/or a laser, for example, via femtosecond laser pulses generated by the laser.

In accordance with another embodiment of the present invention, a method of manufacturing a biopolymer photonic crystal is provided including, providing a biopolymer, processing the biopolymer to yield a biopolymer matrix solution, providing a substrate, casting the matrix solution on the substrate, and drying the biopolymer matrix solution to form a solidified biopolymer film. In the preferred embodiment, a plurality of substrates are provided and the matrix solution is cast on the substrates and dried to provide a plurality of biopolymer films, which are then, stacked together to form the biopolymer photonic crystal. In accordance with one embodiment, the method includes machining a nanopattern on the at least one solidified biopolymer film. In another embodiment, the substrate includes a nanopatterned surface, and the biopolymer matrix solution is cast on the nanopatterned surface of the substrate so that the solidified biopolymer film is formed with a surface having a nanopattern thereon.

In accordance with another aspect of the present invention, a photonic crystal is provided which is made of at least one biopolymer film having a nanopatterned surface thereon. In one preferred embodiment, the photonic crystal includes a plurality of nanopatterned films that are stacked together, the films being made of a biopolymer. In one embodiment, the plurality of nanopatterned biopolymer films may be oriented so that adjacent biopolymer films have differing orientations. In another embodiment, the stacked nanopatterned films are bound together. Preferably, the biopolymer is silk, chitosan, collagen, gelatin, agarose, chitin, polyhydroxyalkanoates, pullan, starch (amylose amylopectin), cellulose, hyaluronic acid, and related biopolymers In accordance with another embodiment, the biopolymer photonic crystal includes an embedded organic material such as red blood cells, horseradish peroxidase, phenolsulfonphthalein, nucleic acid, a dye, a cell, an antibody, enzymes, for example, peroxidase, lipase, amylose, organophosphate dehydrogenase, ligases, restriction endonucleases, ribonucleases, DNA polymerases, glucose oxidase, laccase, cells, viruses, proteins, peptides, small molecules (e.g., drugs, dyes, amino acids, vitamins, antioxidants), DNA, RNA, RNAi, lipids, nucleotides, aptamers, carbohydrates, chromophores, light emitting organic compounds such as luciferin, carotenes and light emitting inorganic compounds (such as chemical dyes), antibiotics, antifungals, antivirals, light harvesting compounds such as chlorophyll, bacteriorhodopsin, protorhodopsin, and porphyrins and related electronically active compounds, or a combination thereof.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

Initially, it is noted that in view of the superior functional characteristics and processability that were noted above, biopolymer photonic crystals of the present invention are described herein below as being implemented with silk, which is biocompatible and biodegradable. In this regard, the silk utilized was silkworm silk. However, there are many different silks, including spider silk, transgenic silks, and genetically engineered silks, variants and combinations thereof and others, that may alternatively be used in accordance with the present invention to manufacture a biopolymer photonic crystal in accordance with the present invention.

In addition, other biodegradable polymers may be used instead of silk. For example, some biopolymers, such as chitosan, exhibit desirable mechanical properties, can be processed in water, and forms generally clear films for optical applications. Other biopolymers, such as collagen, cellulose, chitin, hyaluronic acid, amylose, and the like may alternatively be utilized in specific applications, and synthetic biodegradable polymers such as polylactic acid, polyglycolic acid, polyhydroxyalkanoates, and related copolymers may also be selectively used. Some of these polymers are not easily processable in water. Nonetheless, such polymers may be used by themselves, or in combinations with silk, and may be used to manufacture biopolymer photonic crystals for specific applications.

Figure 1:
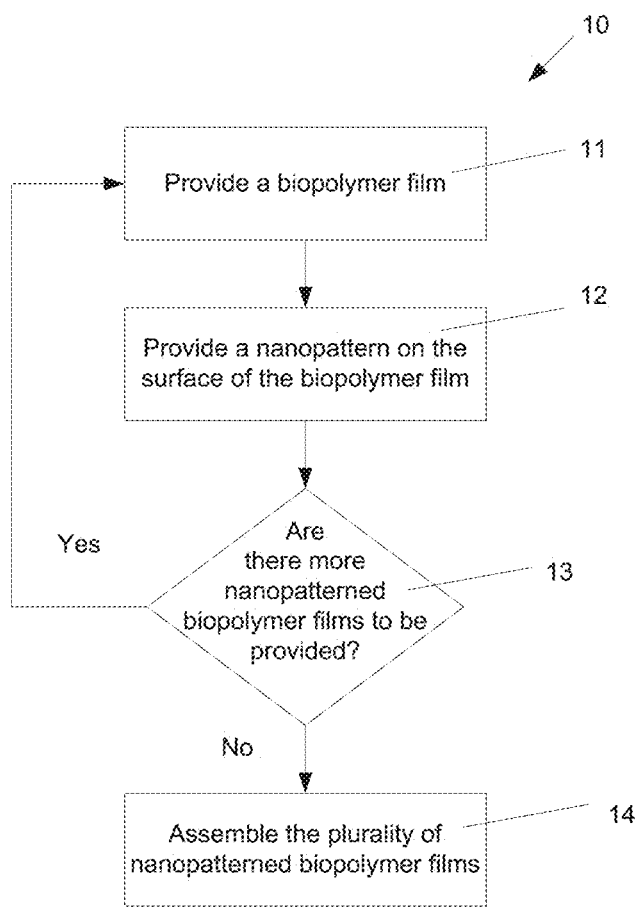
FIG. 1 is a schematic flow diagram illustrating a method for manufacturing a biopolymer photonic crystal in accordance with one embodiment of the present invention.

FIG. 1 is a schematic flow diagram 10 illustrating the general method for manufacturing a biopolymer photonic crystal in accordance with one preferred embodiment of the present invention. The method includes providing a biopolymer film in step 11 and providing a nanopattern on the surface of the biopolymer film in step 12. In step 13, if more than one biopolymer film is to be used in the photonic crystal, the nanopatterned biopolymer films are assembled in step 14 by stacking them together to thereby form a three dimensional biopolymer photonic crystal. It should also be noted that a single nanopatterned biopolymer film may be used as a photonic crystal as well in other embodiments. However, fabricating the photonic crystal using a plurality of nanopatterned biopolymer films provides the additional advantage of increased structural stability and capability to combine films with different nanopatterns or different optical characteristics to produce a customized photonic crystal with the desired optical characteristics, which is not as easily attainable using a single biopolymer film.

It should be initially noted that the term "nanopatterned" as used herein refers to very small patterning that is provided on a surface of the biopolymer films, the patterning having structural features of a size that can be appropriately measured on a nanometer (nm) scale (that is, $10^{-9}$ meters). For example, sizes ranging from 100 nm to a few microns are typical of the patterning used in accord with the present invention.

The optical quality and toughness of silk, and in particular, films made from silk, makes them ideal candidates for use in biocompatible engineered optical devices. In particular, these biocompatible engineered optical devices can then be appropriately structured for processing electromagnetic waves, including visible light wavelengths. Correspondingly, to manufacture biopolymer photonic crystals in accordance with the present invention, optical quality biopolymer films are manufactured with regular pattern structures that have a very fine length scale (nanoscale).

Figure 2:
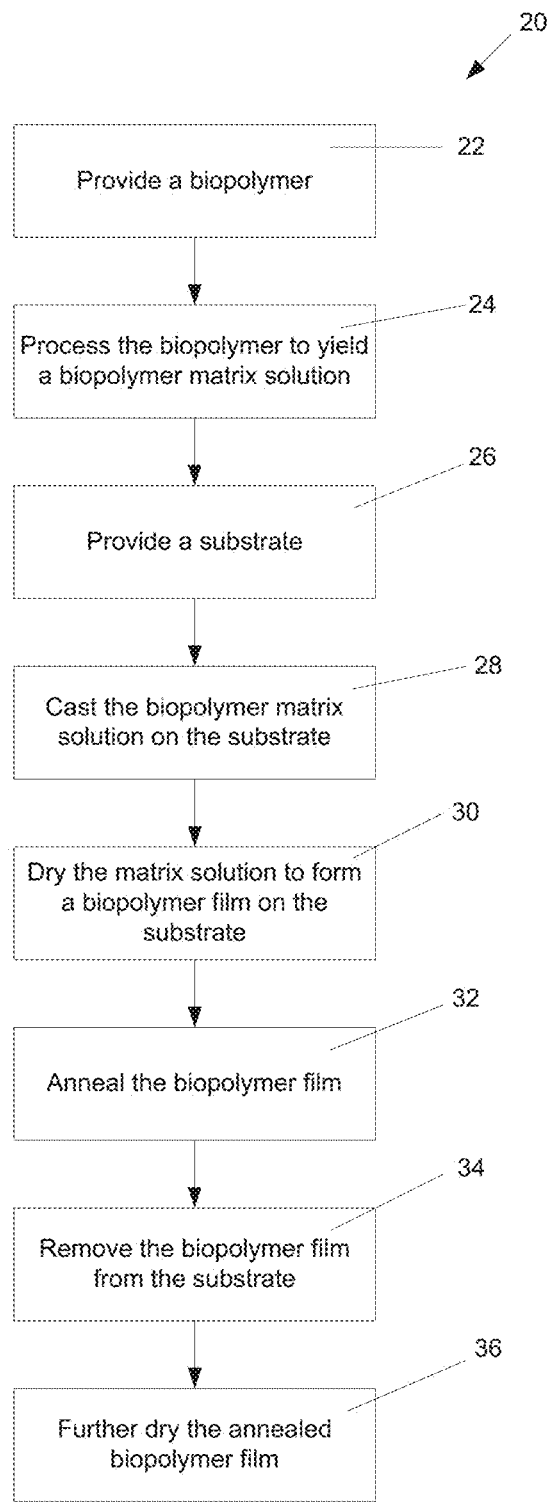
FIG. 2 is a schematic flow diagram illustrating a method for manufacturing a biopolymer film or films used to fabricate the biopolymer photonic crystal in accordance with one embodiment.

In the above regard, FIG. 2 is a schematic flow diagram 20 illustrating one method for manufacturing nanopatterned biopolymer films for use in manufacturing a biopolymer photonic crystal in accordance with one embodiment of the present invention. In particular, a biopolymer is provided in step 22. In the example where the biopolymer is silk, the silk biopolymer may be provided by extracting sericin from the cocoons of *Bombyx mori*. The provided biopolymer is processed to yield a biopolymer matrix solution in step 24. In one embodiment, the biopolymer matrix solution is an aqueous solution. However, in other embodiments, different solvents other than water, or a combination of solvents may be used, depending on the biopolymer provided.

Thus, in the example of silk, an aqueous silk fibroin solution is processed in step 24, for example, 8.0 wt %, which is used to manufacture the biopolymer films of the biopolymer photonic crystal. Of course, in other embodiments, the solution concentrations may also be varied from very dilute (approximately 1 wt %) to very high (up to 30 wt %) using either dilution or concentration, for example, via osmotic stress or drying techniques. Production of aqueous silk fibroin solution is described in detail in WIPO Publication Number WO 2005/012606 entitled "Concentrated Aqueous Silk Fibroin Solution and Uses Thereof," which is incorporated by reference.

A substrate is provided in step 26 to serve as a mold in manufacturing the biopolymer film. The aqueous biopolymer matrix solution is then cast on the substrate in step 28. The biopolymer matrix solution is dried in step 30 to transition the aqueous biopolymer matrix solution to the solid phase. In this regard, the aqueous biopolymer matrix solution may be dried for a period of time such as 24 hours, and may optionally be subjected to low heat to expedite drying of the aqueous biopolymer solution. Other drying techniques may also be used such as isothermal drying, roller drying, spray drying, and heating techniques. Upon drying, a biopolymer film is formed on the surface of the substrate. The thickness of the biopolymer film depends upon the volume of the biopolymer matrix solution applied to the substrate.

Once the drying is complete and the solvent of the biopolymer matrix solution has evaporated, the biopolymer film is then optionally annealed in step 32. This annealing step may be performed within a water vapor environment, such as in a chamber filled with water vapor, for different periods of time depending on the material properties desired. Typical time periods may range from two hours to two days, for example, and the optional annealing may also be performed in a vacuum environment. The annealed biopolymer film is then removed from the substrate in step 34 and allowed to dry further in step 36. The film manufactured in the above-described manner can be used as a photonic crystal that is biodegradable. In addition, a plurality of such films can be used in manufacturing a biopolymer photonic crystal in accordance with the method of FIG. 1.

Patterned nanostructures can be provided on the biopolymer films, such as the silk films manufactured in the above discussed manner. In one embodiment, the surface of the substrate may be smooth so as to provide a smooth biopolymer film, and a nanopattern may be machined on the surface of the biopolymer film. The nanopattern may be machined using a laser, such as a femtosecond laser, or by other nanopattern machining techniques, including lithography techniques such as photolithography, electron beam lithography, and the like. Using such techniques, nanopattern features as small as 700 nm that are spaced less than 3 µm have been demonstrated as described in further detail below.

In another embodiment, the surface of the substrate itself may have an appropriate nanopattern thereon so that when the solidified biopolymer film is removed from the substrate, the biopolymer film is already formed with the desired nanopattern on a surface thereof. In such an implementation, the substrate may be an optical device such as a nanopatterned optical grating, depending on the nanopattern desired on the biopolymer films. The substrate surfaces may be coated with Teflon™ and other suitable coatings to ensure even detachment after the biopolymer matrix solution transitions from the liquid to the solid phase. The ability of the biopolymer casting method using a nanopatterned substrate for forming highly defined nanopatterned structures in the resultant biopolymer films was verified, and silk films having nanostructures as small as 75 nm and RMS surface roughness of less than 5 nm have been demonstrated.

The measured roughness of cast silk film on an optically flat surface shows measured root mean squared roughness values between 2.5 and 5 nanometers, which implies a surface roughness easily less than λ/50 at a wavelength of 633 nm. Atomic force microscope images of patterned silk diffractive optics show the levels of microfabrication obtainable by casting and lifting silk films off of appropriate molds. The images show definition in the hundreds of nanometer range and the sharpness of the corners indicates the possibility of faithful patterning down to the tens of nanometers.

Figure 3:
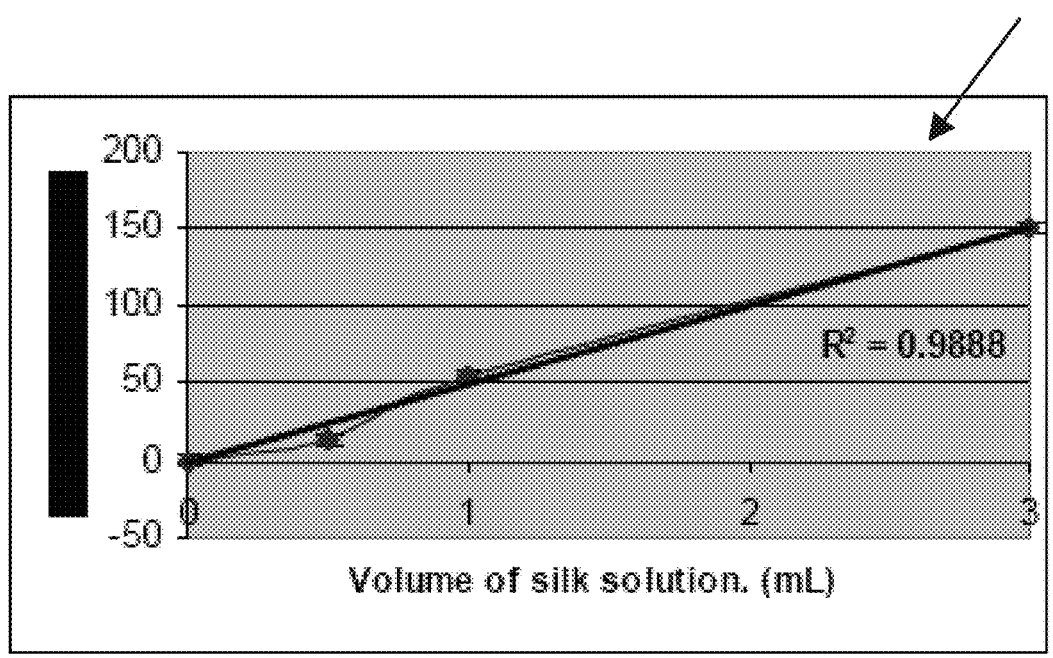
FIG. 3 is a graph that illustrates the relationship between the volume of 8% silk concentration vs. film thickness.

Experiments were conducted to validate the efficacy of the above-described biopolymer films and the method of manufacturing the biopolymer films that can then be used as photonic crystals, or that can be assembled into a biopolymer photonic crystal. In particular, graph 40 of FIG. 3 illustrates the relationship between the volume of 8 wt % silk concentration aqueous silk fibroin solution and the resulting silk film thickness, where the aqueous silk fibroin solution is cast over a substrate surface of approximately 10 square centimeters. The X-axis shows the volume of silk solution in mL, and the Y-axis shows the thickness of the resultant biopolymer film in μm.

Of course, the film properties, such as thickness and biopolymer content, as well as optical features, may be altered based on the concentration of fibroin used in the process, the volume of the aqueous silk fibroin solution deposited, and the post deposition process for drying the cast solution. Accurate control of these parameters is desirable to ensure the optical quality of the resultant biopolymer optical device and to maintain various characteristics of the biopolymer optical device, such as transparency, structural rigidity, or flexibility. Furthermore, additives to the biopolymer matrix solution may be used to alter features of the biopolymer optical device such as morphology, stability, and the like, as with polyethylene glycols, collagens, and the like.

Figure 4A:
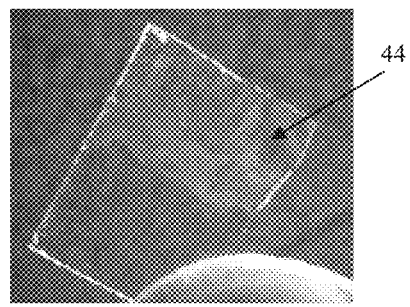
FIG. 4A is a photograph of an unpatterned silk film.
Figure 4B:
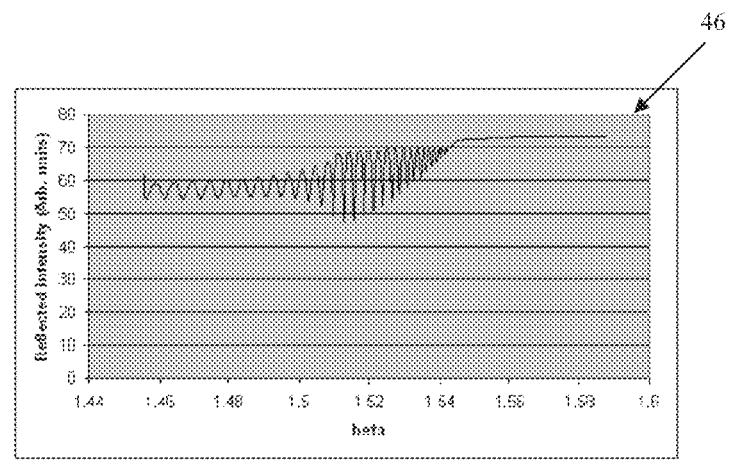
FIG. 4B is a graph showing the prism-coupled angular dependence of reflectivity of the unpatterned silk film of FIG. 4A.

FIG. 4A illustrates the unpatterned biopolymer film 44 having a thickness of 10 μm, which was manufactured in the above described manner using an aqueous silk fibroin solution and was characterized in a scanning prism coupled reflectometer from Metricon Corporation. The index of refraction of the biopolymer film 44 was measured to be n=1.55 at 633 nm, which is slightly higher than the index of refraction of conventional borosilicate glass. The measured index of refraction confirms that the value is high enough to afford reasonable contrast for optical use such as in air-silk biopolymer photonic crystals (BPC) ($\Delta n_{fibroin} - \Delta n_{air} = 0.55$). The characterization of the unpatterned silk film 44 is shown in graph 46 of FIG. 4B, which clearly demonstrates the prism coupled angular dependence of the reflectivity. The oscillations in graph 46 are due to coupling into guided waves, demonstrating the use of silk as a waveguide material.

Figure 4C:
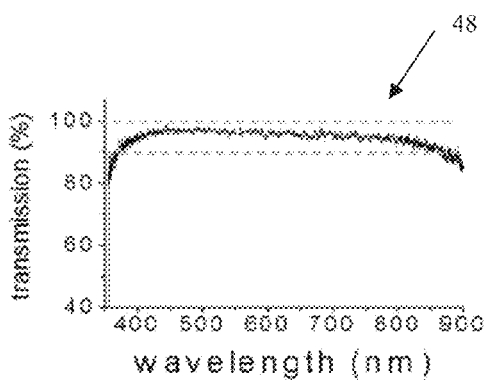
FIG. 4C is a graph showing the measured transmission of light through the unpatterned silk film of FIG. 4A.

In addition, the unpatterned silk film 44 was also analyzed to determine transparency. FIG. 4C is a graph 48 that illustrates the measured transmission of light through the silk film 44 in various wavelengths. Transmission measurements indicate that the unpatterned silk film 44 was highly transparent across the visible spectrum. For comparison, similar thickness films were also cast in collagen and polydimethylsiloxane (PDMS). While the free-standing structural stability was found to be inferior, and the resultant biopolymer optical devices were not self-supporting when implemented as a thin film, such biopolymers may be used in applications where structural stability is less important.

The structural stability and ability to have a nanostructure thereon makes the above-described silk films appropriate for use as a photonic crystal and for use in manufacture of biopolymer photonic crystals. As previously noted, the material properties of silk films are well-suited for patterning on the nanoscale, for example, using soft lithography and laser machining techniques. With appropriate relief masks, silk films may be cast and left to solidify upon the surface and subsequently detached. The silk casting and solidification process allows the formation of highly-defined patterned structures on the nanoscale as described below which enables the production of biopolymer films that can be used for manufacturing biopolymer photonic crystals.

Figure 5:
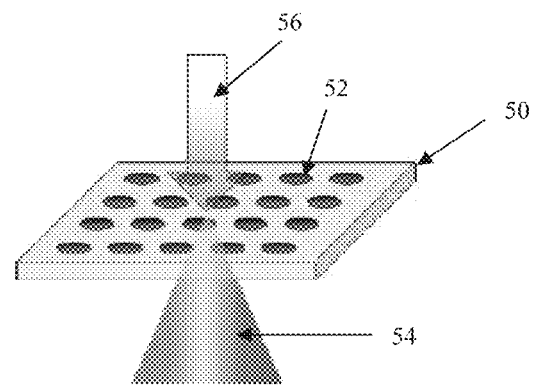
FIG. 5 is a schematic illustration of a nanopatterned silk film that functions as a photonic bandgap.

FIG. 5 is a schematic illustration of a nanopatterned biopolymer film 50 manufactured for use in fabrication of a biopolymer photonic crystal where the film 50 functions as a photonic bandgap. The nanopatterned biopolymer film 50 selects light according to the nanopattern structure 52 provided on its surface and includes an air/dielectric structure with periodicity on the order of the wavelength. Light selectivity is schematically shown by spectrum 54 generated upon application of white light 56 upon biopolymer film 50. The nanopatterned biopolymer film 50 is biocompatible and allows manufacturing of a biopolymer photonic crystal that can be used to manipulate light via an organic, yet mechanically robust optical device. As noted, such nanopattern structure 52 on the biopolymer film 50 may be machined using a laser, soft lithography techniques, or integrally formed thereon.

Figure 6A:
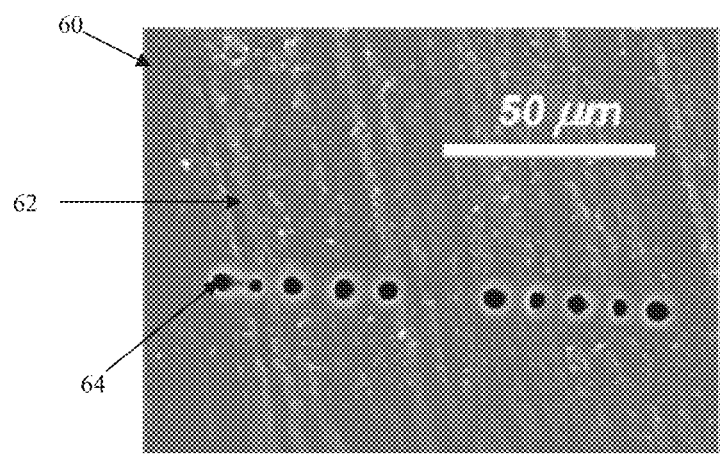
FIG. 6A is a microscope image of a portion of a nanopatterned silk film on which a regular array of holes is provided.
Figure 6B:
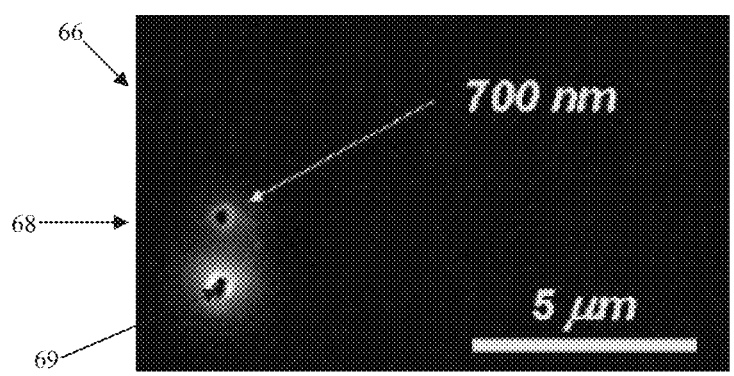
FIG. 6B is an additional microscope image of a portion of another nanopatterned silk film on which an array of holes is provided.

Machining of silk films to provide nanopatterning has been demonstrated using a femtosecond laser, and sub-diffraction limit spot size patterning has been achieved. FIG. 6A is a microscope image 60 of a portion of a nanopatterned silk film 62 of 40 μm thickness on which a regular array of holes 64 has been machined. These holes 64 were machined by laser ablation using 810 nm femtosecond laser pulses. FIG. 6B is a microscope image 66 of a portion of another nanopatterned silk film 68 on which an array of holes 69 has been machined thereon, these holes 69 being as small as 700 nm. These holes 69 of FIG. 6B were obtained with the same laser as that used to provide holes 64 of FIG. 6A, but using different focusing conditions.

In particular, to provide such holes, femtosecond laser pulses from a commercial mode-locked titanium sapphire laser called Tsunami®, available through Spectra Physics Division of Newport Corporation, was utilized with the following specification: t=100 fs; average power=1.1 W; repetition rate=80 MHz; and wavelength=810 nm. The laser pulses were focused by a moderate numerical aperture (NA=0.4) ball lens onto the silk films. The laser beam is elliptical in shape due to an uncompensated astigmatism in the laser cavity. The shape of the beam is not reflected in the holes produced because of the nonlinear nature of the ablation process. As noted, holes 64 of FIG. 6A and holes 69 of FIG. 6B were obtained with the same laser, but with different focusing conditions.

The above-described method for machining the nanopattern on the surface of the biopolymer film relies on a multi-photon process that uses the ultraviolet absorption of fibroin so that the use of femtosecond lasers in the infrared region machines the surfaces with precision, while using only a portion of the electric-field above threshold. The absorption band centered around 270 nm is a good match for a three-photon process using machining photons at a wavelength of 810 nm. This laser manufacturing ability allows for controlled machining of a nanopattern on the biopolymer films made of silk, much in the way that laser machining has been successful in photomask repair and in multi-photon polymerization. The multi-photon ablation process and the associated multi-photon absorption also allow obtaining of diffraction limited, or sub-diffraction limited, spot sizes in biopolymer films.

Figure 7:
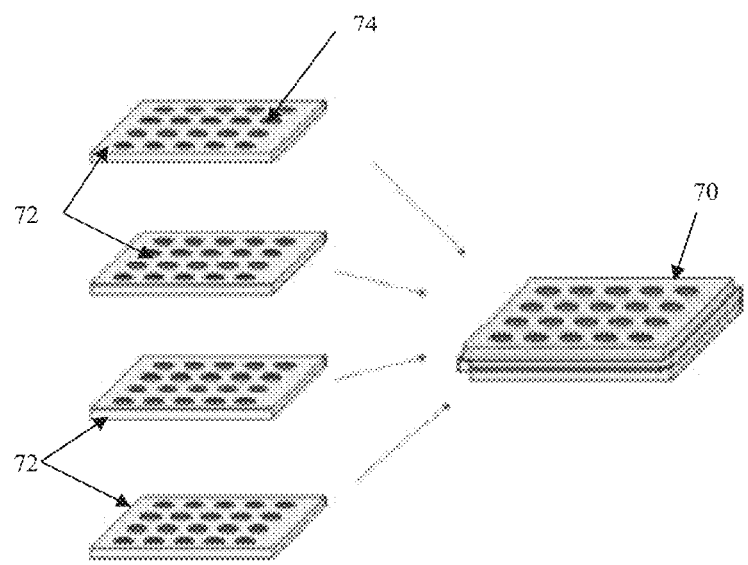
FIG. 7 is a schematic illustration of the layered construction of a biopolymer photonic crystal in accordance with one embodiment of the present invention in which the biopolymer photonic crystal is assembled using a plurality of biopolymer films such as those shown in FIGS. 6A and 6B.

As explained above, in accordance with the present invention, the individual biopolymer films that are machined or formed to have nanopatterns thereon are used as building blocks to manufacture three-dimensional biopolymer photonic crystals by stacking the individual biopolymer film layers together. In this regard, FIG. 7 schematically illustrates the layered construction of a three-dimensional biopolymer photonic crystal 70 in accordance with the present invention. As shown, the biopolymer photonic crystal 70 is formed by stacking a plurality of biopolymer films 72 that have been manufactured to provide nanopatterning 74 thereon. For clarity and brevity four biopolymer films 72 are illustrated in the example embodiment of FIG. 7, but any number of biopolymer films 72 may be stacked together to provide the biopolymer photonic crystal 70 in other embodiments. The stacked plurality of biopolymer films 72 may be optionally bound together using various methods. For example, small quantities of the aqueous biopolymer matrix solution may be provided between the biopolymer films 72 to function as a glue between the films. The films may also be crosslinked using enzymes such as transglutaminase. In another embodiment, other chemicals may be used to bind the biopolymer films 72 together such as carbodimide or gluteraldehyde vapors, or the like. Other alternatives for biding the biopolymer films 72 include using fibrin or methacrylate. Of course, the above substances and methods for optionally binding the biopolymer films 72 together are merely provided as examples only, and the present invention is not limited thereto.

Figure 8A:
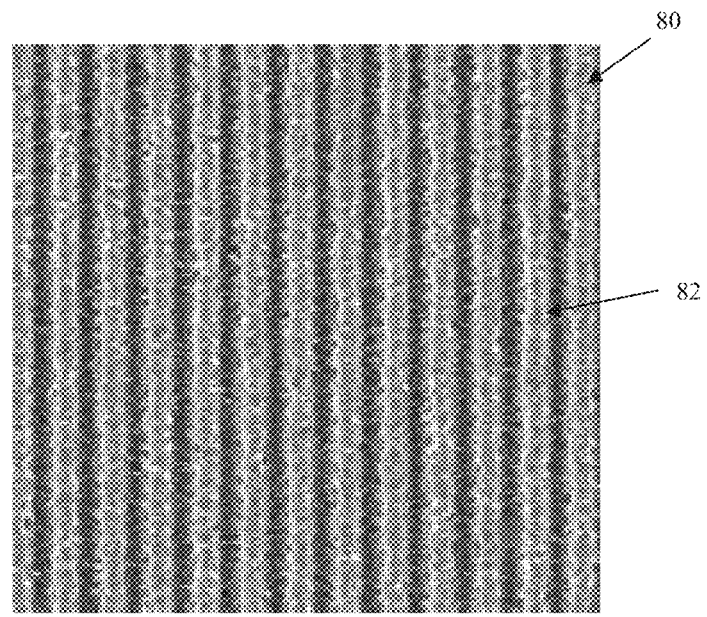
FIG. 8A is a microscope image of a portion of a biopolymer film manufactured in accordance with another embodiment of the present invention.
Figure 8B:
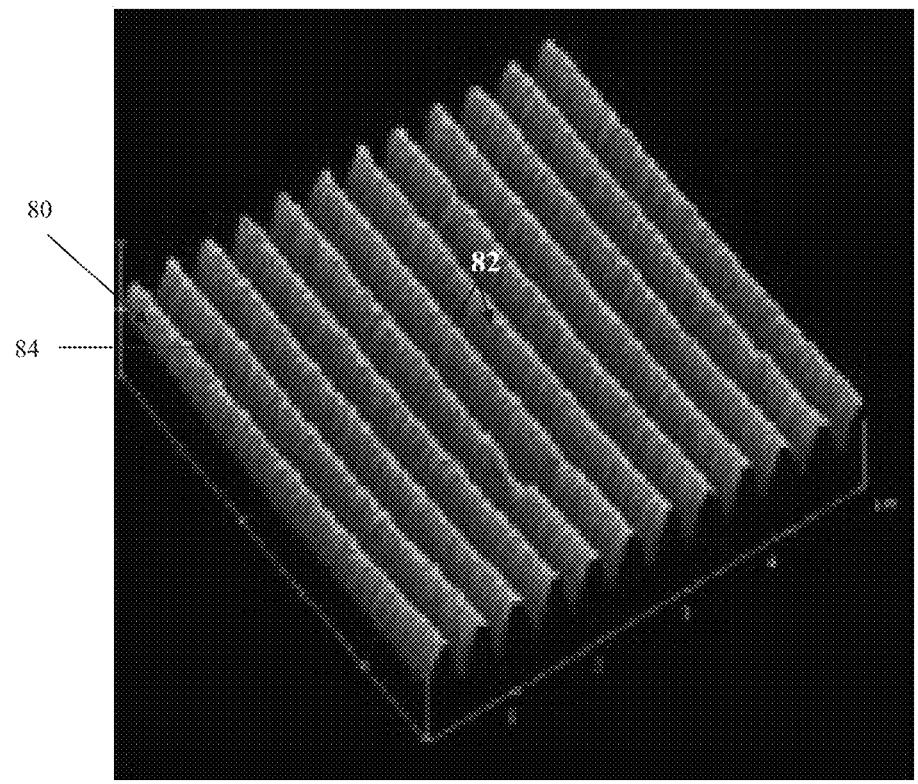
FIG. 8B is an additional microscope image of a portion of a biopolymer film shown in FIG. 8B.

As also explained, the nanopatterning of the biopolymer film may alternatively be integrally formed with the biopolymer film by casting the biopolymer matrix solution on a substrate having the desired nanopattern on its surface. In this regard, holographic diffraction gratings of various line pitches were used as substrates upon which aqueous silk fibroin solution was cast to form the biopolymer film. FIG. 8A is a scanning electron microscope image of a portion of a biopolymer film 80, in this case, a nanopatterned biopolymer diffraction grating, which was manufactured in accordance with the method of FIG. 2 by casting an aqueous silk fibroin solution on a holographic diffraction grating substrate with 2,400 lines/mm. The resultant biopolymer film 80 formed of silk also has gratings 82 at 2,400 lines/mm. FIG. 8B is an atomic force microscope (AFM) image of a portion of the surface of the nanopatterned biopolymer film 80. The ridges were approximately 200 nm wide and spaced by approximately 200 nm at full width at half maximum (FWHM). The peak to valley height difference of 150 nm was observed. As can be seen from the image of FIG. 8B, highly regular, structured nanopatterning was achieved. A topographical evaluation revealed surface roughness root mean square (RMS) values below 20 nm while being structurally stable.

Figure 9:
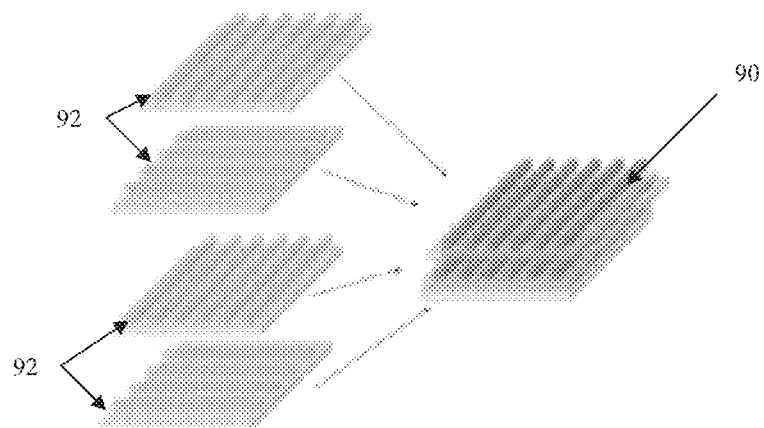
FIG. 9 is a schematic illustration of the layered construction of a biopolymer photonic crystal in accordance with yet another embodiment of the present invention in which the biopolymer photonic crystal is assembled using a plurality of biopolymer films such as those shown in FIGS. 8A and 8B.

FIG. 9 schematically illustrates the layered construction of a three-dimensional biopolymer photonic crystal 90 in accordance with another embodiment. The biopolymer photonic crystal 90 of FIG. 9 is constructed using nanopatterned biopolymer films 92 discussed above relative to FIGS. 8A and 8B as building blocks. As can be seen, the individual nanopatterned biopolymer films 92 are biopolymer diffraction gratings that may be formed by casting the aqueous silk fibroin solution on a holographic diffraction grating as described above. As shown in FIG. 9, the biopolymer photonic crystal 90 is formed by stacking the plurality of nanopatterned biopolymer films 92 together. In addition, in the illustrated example, the nanopatterned biopolymer films 92 are stacked in an alternating orientation so that the nanopatterns of the adjacent gratings are perpendicular to one another. Of course, in other embodiments, such nanopatterned biopolymer films may be stacked in an aligned orientation or another angled orientation, depending on the optical result desired. In addition, whereas four biopolymer films 92 are illustrated in the example embodiment of FIG. 9, any number of biopolymer films 92 may be stacked together to provide the biopolymer photonic crystal 90 in other embodiments.

Thus, as can be appreciated from the above discussion, manufacturing of a three-dimensional biopolymer photonic crystal is performed in accordance with one embodiment of the present invention by manufacturing and stacking a plurality of nanopatterned biopolymer films together. As explained, the nanopatterning of the biopolymer films can be performed by machining, for example, by laser or by forming the biopolymer films with the nanopatterning integral thereon. These biopolymer films may optionally be bound together, for example, by using small quantities of the aqueous biopolymer matrix solution or by using other substances as described above relative to the embodiment of FIG. 7.

Important advantages and functionality can be attained by the biopolymer photonic crystal in accordance with the present invention, whether it is implemented by a single film or by an assembly of stacked films. In particular, the biopolymer photonic crystal can be biologically functionalized by optionally embedding it with one or more organic indicators, living cells, organisms, markers, proteins, and the like. More specifically, the biopolymer photonic crystals in accordance with the present invention may be embedded or coated with organic materials such as red blood cells, horseradish peroxidase, phenolsulfonphthalein, nucleic acid, a dye, a cell, an antibody, as described further in Appendix I, enzymes, for example, peroxidase, lipase, amylose, organophosphate dehydrogenase, ligases, restriction endonucleases, ribonucleases, DNA polymerases, glucose oxidase, laccase, cells, viruses, proteins, peptides, small molecules (e.g., drugs, dyes, amino acids, vitamins, antioxidants), DNA, RNA, RNAi, lipids, nucleotides, aptamers, carbohydrates, chromophores, light emitting organic compounds such as luciferin, carotenes and light emitting inorganic compounds (such as chemical dyes), antibiotics, antifungals, antivirals, light harvesting compounds such as chlorophyll, bacteriorhodopsin, protorhodopsin, and porphyrins and related electronically active compounds, tissues or other living materials, other compounds or combinations thereof. The embedded organic materials are biologically active, thereby adding biological functionality to the resultant biopolymer photonic crystal.

The embedding of the biopolymer photonic crystal with organic materials may be performed for example, by adding such materials to the biopolymer matrix solution used to manufacture the biopolymer films, such as the silk fibroin matrix solution. In the implementation where the biopolymer photonic crystal is manufactured by stacking a plurality of biopolymer films, the photonic crystal can be biologically functionalized by functionalizing of one or more of the biopolymer films. Alternatively, or in addition thereto, such added organic materials can be sandwiched between the biopolymer film layers that make up the biopolymer photonic crystal in such an implementation.

Figure 10:
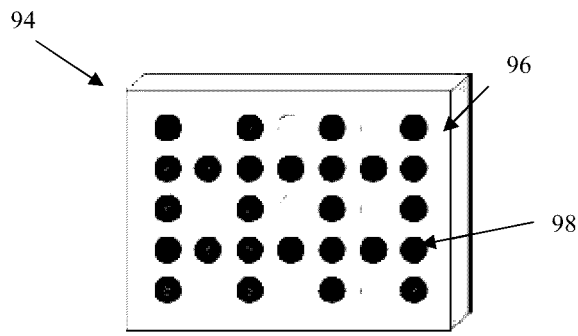
FIG. 10 shows a schematic illustration of a nanopatterned biopolymer film that has been functionalized with a biological binding.

FIG. 10 is a schematic illustration of a photonic crystal 94 that is implemented by a nanopatterned biopolymer film 96 that has been biologically functionalized with an organic material, such as a biological marker. The silk matrix may be embedded with a number of indicators, including organic materials, living cells, antibodies, organisms, other biological markers, and the like. FIG. 10 shows a functionalized biophotonic structure that is nanopatterned biopolymer film 96 and the diffraction that occurs when light is applied. As illustrated, the embedded biological markers react to the presence of specific substances, biologically binding to the lattice sites of the nanopattern structure 98 provided on the surface of the biopolymer film 96. Such reactions and biological binding alters the band gap transmission, thereby altering the spectral features of the transmitted light.

Figure 11:
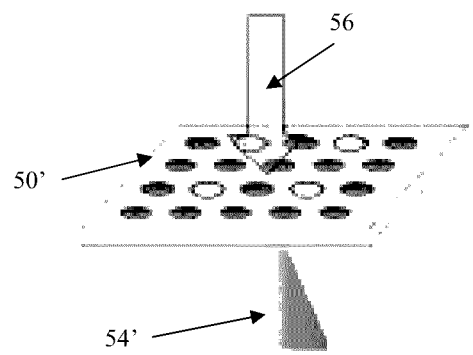
FIG. 11 shows a schematic illustration of an altered photonic bandgap of a functionalized nanopatterned biopolymer film.

While FIG. 5 illustrates a biopolymer film 50 and the diffraction spectrum 54 that occurs when light is applied to the biopolymer film 50. In contrast, FIG. 11 shows nanopatterned biopolymer film 50' that includes an embedded organic material. The resulting diffraction spectrum 54' from the nanopatterned biopolymer film 50' that includes an embedded organic material is different than the diffraction spectrum 54 that occurs in the absence of an embedded organic material. Reactions at the biopolymer film level affect the interaction of the light with the functionalized biopolymer photonic crystal of the present embodiment. Substances that react to the biological markers alter the optical properties of the biophotonic bandgap, thereby affecting the interaction of light with the functionalized biophotonic structure. The biopolymer photonic crystals in accordance with the present invention allow embedding of proteins, peptides, DNA, RNA, enzymes, protein complexes, viruses, cells, antibodies, other biomolecules, dyes or other compounds, tissues or other living materials, or combinations thereof, within the biopolymer such as silk, or coating a surface of the biopolymer devices as well.

The biologically induced variation in the photonic bandgap and spectral selectivity of the resultant biopolymer photonic crystal can be used to determine the presence of particular substances, and biological processes can also be sensitively monitored optically. In particular, such substances may be detected based on the changes in the optical properties of the biopolymer photonic crystal, since the change in spectral selectivity can be correlated to the features of the photonic crystal structure and/or to the organic materials embedded therein. This is especially advantageous in applications where biopolymer photonic crystals are used as sensors to provide recognition and/or response functions.

Correspondingly, as explained, dielectrics and metallo-dielectrics used in conventional photonic crystals can be replaced with silk or with other biopolymers in accordance with the present invention to allow the fabrication of biopolymer photonic crystals. In addition, the present invention may be used to provide customized biopolymer photonic crystals for use as bio-optical filters by allowing the variability of the bandgap or tuning of the biological-bandgaps.

Furthermore, it should also be appreciated that further fabrication of biophotonic bandgap materials and functionalization may be performed by hybridizing the biopolymer photonic crystal of the present invention. For example, the biopolymer photonic crystal and/or biopolymer films constituting the photonic crystal may be deposited with thin metallic layers to provide differing optical characteristics. The bulk index of the biopolymer photonic crystal can be affected in this manner to enhance the contrast factor and to tailor the spectral selectivity. Such hybridized biopolymer photonic crystals may be advantageously used as bioplasmonic sensors, thereby integrating electromagnetic resonance, optics, and biological technologies together in a biocompatible optical device.

Figure 12:
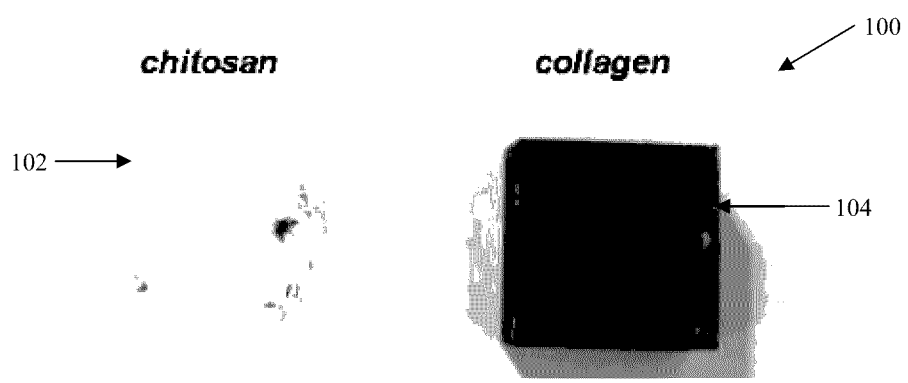
FIG. 12 illustrates diffractive biopolymer optical devices that have been cast with chitosan and collagen.

As also previously noted, alternative polymers may also be used for fabrication of biopolymer photonic crystals in accordance with the present invention. In this regard, FIG. 12 is a photograph 100 that shows other diffractive biopolymer optical devices that have been cast using different materials. In particular, a chitosan optical device 102, and collagen optical device 104 have also been manufactured. With respect to chitosan, optical diffraction characteristics similar to silk have been observed.

As can be appreciated from the above discussion, manufacturing of the biopolymer photonic crystal is performed by providing a biopolymer film with a nanopatterned surface thereon to have the desired bandgap or desired partial bandgap, spectral selectivity and/or optical functionality. In the preferred embodiment, manufacturing the biopolymer photonic crystal is performed by manufacturing a plurality of nanopatterned biopolymer films and stacking them to produce a biopolymer photonic crystal that has the desired bandgap, partial bandgap, spectral selectivity, and/or optical functionality. The resultant biopolymer photonic crystal allows manipulation of light via an organic yet mechanically robust optical device, thereby combining the flexibility of embedded optics with the unique versatility of biopolymers. Thus, the biopolymer photonic crystal of the present invention combines (a) the organic nature of biopolymers, such as silk, which is controllably degradable, biocompatible, and structurally strong; (b) the power of diffractive and transmissive optics embedded in an organic matrix; and (c) the creation of biologically active optical elements. As explained above, the biopolymer photonic crystals of the present invention may be biologically activated by incorporating organic material. For example, biologically active complex proteins such as hemoglobin in red blood cells and enzymes such as peroxidase may be used. Correspondingly, the present invention broadens the versatility of optical devices by allowing the direct incorporation of labile biological receptors in the form of peptides, enzymes, cells, antibodies, or related systems, and allows such optical devices to function as biological sensing devices.

The biodegradable biopolymer photonic crystals of the present invention also have the advantage of being naturally biocompatible and being able to undergo degradation with controlled lifetimes. The degradation lifetime of the biopolymer photonic crystals of the present invention can be controlled during the manufacturing process, for example, by controlling the ratio and amount of the solution matrix cast.

As can be appreciated, the biopolymer photonic crystals of the present invention can be readily used in environmental and life sciences where biocompatibility and biodegradability are paramount. For example, the biopolymer photonic crystals as described herein can be unobtrusively used to monitor a natural environment so that the biopolymer photonic crystals can be dispersed in the environment, without the need to retrieve them at a later time, thereby providing novel and useful devices for sensing and detection. In addition, the biopolymer photonic crystals can be used in vivo, for example, implanted in the human body, without a need to retrieve the device at a later time.

The ability to pattern structural proteins on the nanoscale via dip pen nanolithography (DPN) has been described supra. Thus, the biopolymer devices described above may be further downsized to generate chip based arrays in which the patterned substrate serves to generate the overall optical response, while nanoscale wires of silk are written on these patterns with this DPN AFM technique. This provides miniaturized biopolymer optical detectors and devices. In this regard, nanoscale biopolymer devices patterned in a 60 nm matrix may be developed to replicate porous alumina.

The foregoing description of the aspects and embodiments of the present invention provides illustration and description, but is not intended to be exhaustive or to limit the invention to the precise form disclosed. Those of skill in the art will recognize certain modifications, permutations, additions, and combinations of those embodiments are possible in light of the above teachings or may be acquired from practice of the invention. Therefore, the present invention also covers various modifications and equivalent arrangements that fall within the purview of the appended claims.

Antibody Stability in Silk Films

Materials—Anti-IL-8 monoclonal antibody (IgG1) was purchased from eBioscience, Inc. human polyclonal antibody IgG and human IgG ELISA Quantitation Kit were purchased from Bethyl Laboratories Inc. All other chemicals used in the study were purchased from Sigma-Aldrich (St. Louis, Mo.).

Figure 13:
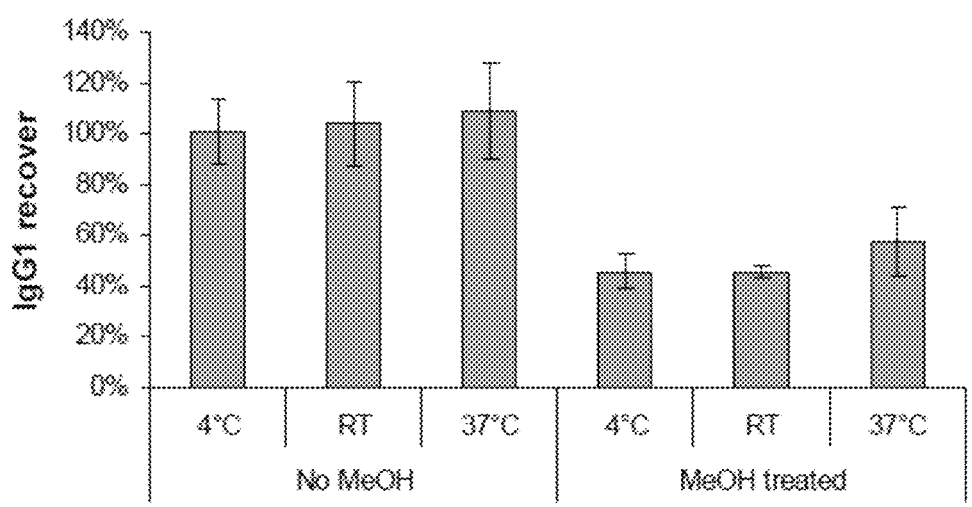
FIG. 13 is an Antibody IgG1 activity related to initial activity in the silk films prepared in the two different formats and stored at the three different temperatures.

Antibody entrapment in silk films—human polyclonal antibody IgG—Ten ml 1 mg/ml IgG mixed with 167 ml 6% silk solution make the IgG concentration in silk film mg/g silk. 100 µl of mixed IgG solution was added to each well of 96 well plate which was placed in a fume hood with cover opened overnight. The dried film was either treated or not treated with methanol. For methanol treatment, the wells were immersed in 90% methanol solution for 5 min and dried in the fume hood. All dry 96 well plates were then stored at 4° C., room temperature, and 37° C. (FIG. 13).

Figure 14:
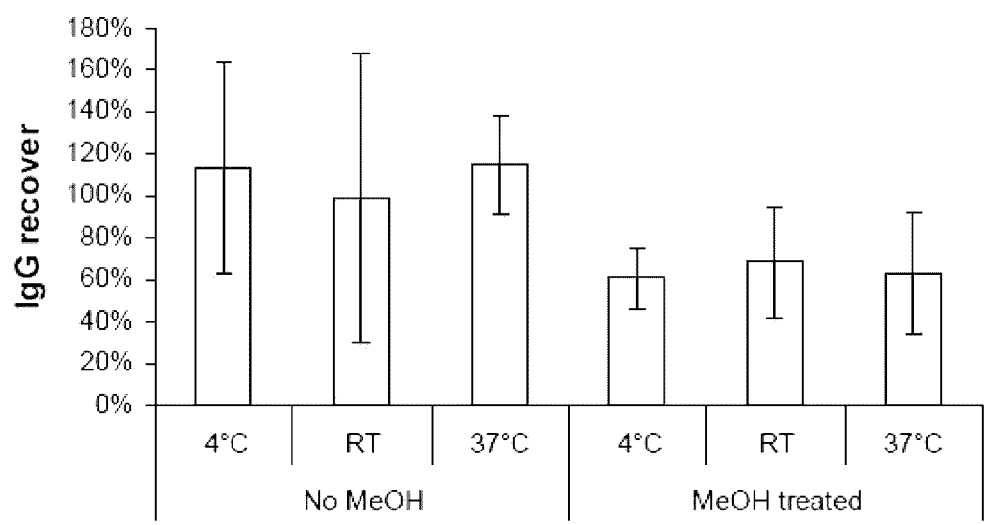
FIG. 14 is an Antibody IgG activity related to initial activity in the silk films prepared in the two different formats and stored at the three different temperatures.

Anti-IL-8 monoclonal antibody (IgG1)—0.5 ml 1 mg/ml IgG1 mixed with 83 ml 6% silk solution make the IgG1 concentration in silk film 0.1 mg/g silk. 50 µl of mixed IgG1 solution was added to a well of 96 well plate which was placed in a fume hood with cover opened overnight. The dried film was either treated or not treated with methanol. For methanol treatment, the wells were immersed in 90% methanol solution for 5 min and dried in the fume hood. All dry 96 well plates were then stored at 4° C., room temperature, and 37° C. (FIG. 14).

Antibody measurement—Five wells prepared at the same condition were measured for statistic. Pure silk (without antibody) was used as a control.

For non methanol-treated samples, 100 µl of PBS buffer, pH 7.4, was added to the well which was further incubated at room temperature for 30 min to allow the film to completely dissolve. Aliquot of solution was then subjected to antibody measurement. For methanol-treated samples, 100 µl HFIP was added into each well which was further incubated at room temperature for 2 hours to allow the film completely dissolve. The silk HFIP solution was dried in a fume hood overnight. The follow step was the same as non methanol-treated samples, added PBS buffer and pipette the solution for antibody measurement.

ELISA—Polystyrene (96-well) microtitre plate was coated with 100 µL of antigen anti-Human IgG-affinity at a concentration of 10 µg/mL prepared in antigen coating buffer (bicarbonate buffer, 50 mM, pH 9.6) and then incubated overnight storage at room temperature. The wells were then washed three times with TBS-T buffer. The unoccupied sites were blocked with 1% BSA in TBS (200 µL each well) followed by incubation for 30 minutes at room temperature. The wells were then washed three times with TBS-T. The test and control wells were then diluted with 100 µL of serially diluted serum. Each dilution was in TBS buffer. Serially diluted blanks corresponding to each dilution were also present. The plate was then incubated for 1 h at room temperature. The plate was washed again with TBS-T buffer (five times). Bound antibodies were assayed with an appropriate conjugate of anti-human IgG-HRP (1:100,000), 100 µL of it was coated in each well and kept at room temperature for 1 hour. Washing of the plate with TBS-T (five times) was followed by addition of 100 µL TMB in each well and incubation at room temperature for 5-20 min. The absorbance of each well was monitored at 450 nm on a VersaMax microplate reader (Molecular devices, Sunnyvale, Calif.).

What is claimed is:

1. A biopolymer photonic crystal, comprising a biopolymer matrix having a nanostructure thereon,
   wherein the biopolymer matrix is or comprises silk, chitosan, collagen, gelatin, agarose, chitin, polyhydroxyalkanoates, pullan, starch, amylose, amylopectin, cellulose, hyaluronic acid, or combinations thereof,
   wherein the biopolymer matrix is a biopolymer film,
   wherein the biopolymer film comprises a surface having a root mean squared (RMS) surface roughness value of between about 2.5 nm and about 5 nm, and
   wherein the nanostructure is or comprises a periodically repeating structure.

2. A biopolymer photonic crystal comprising a biopolymer matrix having a nanostructure thereon,
   wherein the biopolymer matrix is or comprises silk, chitosan, collagen, gelatin, agarose, chitin, polyhydroxyalkanoates, pullan, starch, amylose, amylopectin, cellulose, hyaluronic acid, or a combination thereof; and
   wherein the nanostructure is or comprises a periodically repeating structure;
   further comprising a metallic layer deposited thereon.

3. The biopolymer photonic crystal of claim 1, wherein the biopolymer matrix comprises an organic material embedded therein, coated thereon, or a combination thereof.

4. The biopolymer photonic crystal of claim 3, wherein the organic material is selected from the group consisting of: nucleic acid, a dye, a cell, an antibody, enzymes, peroxidase, lipase, amylose, organophosphate dehydrogenase, ligases, restriction endonucleases, ribonucleases, DNA polymerases, glucose oxidase, laccase, cells, viruses, proteins, peptides, small molecules, drugs, dyes, amino acids, vitamins, antioxidants, DNA, RNA, RNAi, lipids, nucleotides, aptamers, carbohydrates, chromophores, light emitting organic compounds, luciferin, carotenes, light emitting inorganic compounds, chemical dyes, antibiotics, antifungals, antivirals, light harvesting compounds, chlorophyll, bacteriorhodopsin, protorhodopsin, porphyrins, and any combinations thereof.

5. The biopolymer photonic crystal of claim 1, comprising a plurality of biopolymer films, wherein the plurality of biopolymer films comprises layered biopolymer films.

6. The biopolymer photonic crystal of claim 5, further comprising an organic material, wherein the organic material is embedded in at least one of the biopolymer films, sandwiched between the layered biopolymer films, or combination thereof.

7. The biopolymer photonic crystal of claim 1, wherein the biopolymer photonic crystal provides a desired bandgap, a desired partial bandgap, spectral selectivity, optical functionality, or combination thereof.

8. A device comprising the biopolymer photonic crystal of claim 1.

9. The biopolymer photonic crystal of claim 1, wherein the periodically repeating structure comprises an array of pits, holes or combination thereof.

10. The biopolymer photonic crystal of claim 2, wherein the periodically repeating structure comprises an array of pits, holes or combination thereof.

11. The biopolymer photonic crystal of claim 1, wherein the nanostructure is at least about 75 nm in size.

12. The biopolymer photonic crystal of claim 2, wherein the nanostructure is at least about 75 nm in size.

13. The biopolymer photonic crystal of claim 2, wherein the biopolymer matrix is a biopolymer film.

14. The biopolymer photonic crystal of claim 13, wherein the biopolymer film comprises a surface having a root mean squared (RMS) surface roughness value of between about 2.5 nm and about 5 nm.

15. The biopolymer photonic crystal of claim 1, further comprising a metallic layer deposited thereon.

16. A method for manufacturing a biopolymer photonic crystal of claim 1, the method comprising steps of:
providing a biopolymer solution, wherein the biopolymer solution is or comprises silk, chitosan, collagen, gelatin, agarose, chitin, polyhydroxyalkanoates, pullan, starch, amylose, amylopectin, cellulose, hyaluronic acid, or combinations thereof
solidifying the biopolymer solution, so as to provide a biopolymer film; and,
generating a nanostructure on the biopolymer film, wherein the nanostructure is or comprises a periodically repeating structure.

17. The method of claim 16, further comprising a step of: annealing the biopolymer film.

18. The method of claim 17, wherein the step of annealing is performed in a vacuum environment, in a water vapor environment, or a combination thereof.

19. The method of claim 16, wherein the biopolymer solution is approximately 1.0 wt % to 30 wt % silk, inclusive.

20. The method of claim 16, wherein (a) the nanostructure on the biopolymer film is formed on a nanopatterned substrate; (b) the nanostructure on the biopolymer film is generated with a laser.

21. The method of claim 16, further comprising a step of: stacking a plurality of the biopolymer films together, so as to form layered biopolymer films.

22. The method of claim 21, further comprising a step of: binding the layered biopolymer films.

23. The method of claim 21, wherein the step of stacking comprises:
orienting the plurality of biopolymer films, such that adjacent biopolymer films have an aligned orientation or a differing orientation of the nanostructure.

24. The method of claim 16, wherein the biopolymer solution comprises an organic material, wherein the organic material is selected from a group consisting of nucleic acid, a dye, a cell, an antibody, enzymes, peroxidase, lipase, amylose, organophosphate dehydrogenase, ligases, restriction endonucleases, ribonucleases, DNA polymerases, glucose oxidase, laccase, cells, viruses, proteins, peptides, small molecules, drugs, dyes, amino acids, vitamins, antioxidants, DNA, RNA, RNAi, lipids, nucleotides, aptamers, carbohydrates, chromophores, light emitting organic compounds, luciferin, carotenes, light emitting inorganic compounds, chemical dyes, antibiotics, antifungals, antivirals, light harvesting compounds, chlorophyll, bacteriorhodopsin, protorhodopsin, porphyrins, and any combinations thereof.

* * * * *